(12) United States Patent
Barak et al.

(10) Patent No.: US 8,661,328 B2
(45) Date of Patent: Feb. 25, 2014

(54) MANAGING WEB CONTENT ON A MOBILE COMMUNICATION DEVICE

(75) Inventors: Nimrod Barak, Tel Aviv (IL); Stav Grinshpon, Petach Tikva (IL)

(73) Assignee: SAP Portals Israel Ltd, Ra'anana (IL)

( * ) Notice: Subject to any disclaimer, the term of this patent is extended or adjusted under 35 U.S.C. 154(b) by 207 days.

(21) Appl. No.: 13/326,572

(22) Filed: Dec. 15, 2011

(65) Prior Publication Data
US 2013/0159824 A1 Jun. 20, 2013

(51) Int. Cl.
*G06F 17/00* (2006.01)

(52) U.S. Cl.
USPC .......................................................... 715/206

(58) Field of Classification Search
USPC .................................. 715/205, 206, 207, 208
See application file for complete search history.

(56) References Cited

U.S. PATENT DOCUMENTS

| | | | | |
|---|---|---|---|---|
| 6,631,496 | B1* | 10/2003 | Li et al. ......................... | 715/200 |
| 7,984,014 | B2* | 7/2011 | Song et al. ..................... | 707/608 |
| 2004/0133848 | A1* | 7/2004 | Hunt et al. ..................... | 715/500 |
| 2005/0091674 | A1* | 4/2005 | Knight et al. .................. | 719/332 |
| 2008/0046840 | A1* | 2/2008 | Melton et al. .................. | 715/825 |
| 2008/0077571 | A1* | 3/2008 | Harris et al. ....................... | 707/5 |
| 2008/0177461 | A1* | 7/2008 | Blackwood .................... | 701/200 |
| 2008/0209031 | A1* | 8/2008 | Zhu et al. ....................... | 709/224 |
| 2009/0157688 | A1* | 6/2009 | Van De Sluis et al. ......... | 707/10 |
| 2009/0307375 | A1* | 12/2009 | McCarthy ...................... | 709/248 |
| 2010/0095219 | A1* | 4/2010 | Stachowiak et al. .......... | 715/745 |
| 2010/0190474 | A1* | 7/2010 | Rajguru ...................... | 455/412.1 |
| 2010/0205541 | A1* | 8/2010 | Rapaport et al. .............. | 715/753 |
| 2010/0306249 | A1* | 12/2010 | Hill et al. ....................... | 707/769 |
| 2011/0093476 | A1* | 4/2011 | Fukazawa et al. ............. | 707/749 |
| 2011/0106736 | A1* | 5/2011 | Aharonson et al. ............. | 706/12 |
| 2011/0275358 | A1* | 11/2011 | Faenger ........................ | 455/420 |
| 2012/0047425 | A1* | 2/2012 | Ahmed .......................... | 715/234 |
| 2012/0159295 | A1* | 6/2012 | Rabstejnek ................... | 715/205 |
| 2012/0166959 | A1* | 6/2012 | Hilerio et al. ................. | 715/738 |
| 2012/0239732 | A1* | 9/2012 | Liang et al. ................... | 709/203 |
| 2013/0212524 | A1* | 8/2013 | Nurse et al. ................... | 715/788 |

* cited by examiner

*Primary Examiner* — Laurie Ries
(74) *Attorney, Agent, or Firm* — Fish & Richardson P.C.

(57) ABSTRACT

Techniques for managing content on a mobile communication device include generating a first navigation structure of web content including a plurality of linked web content portions; identifying a web content navigation history of a user including one or more web content portions accessed by the user in the plurality of linked web content portions; and generating a second navigation structure of the web content, the second navigation structure including links associated with only the one or more web content portions accessed by the user, the second navigation structure displayable on a mobile communication device.

32 Claims, 9 Drawing Sheets

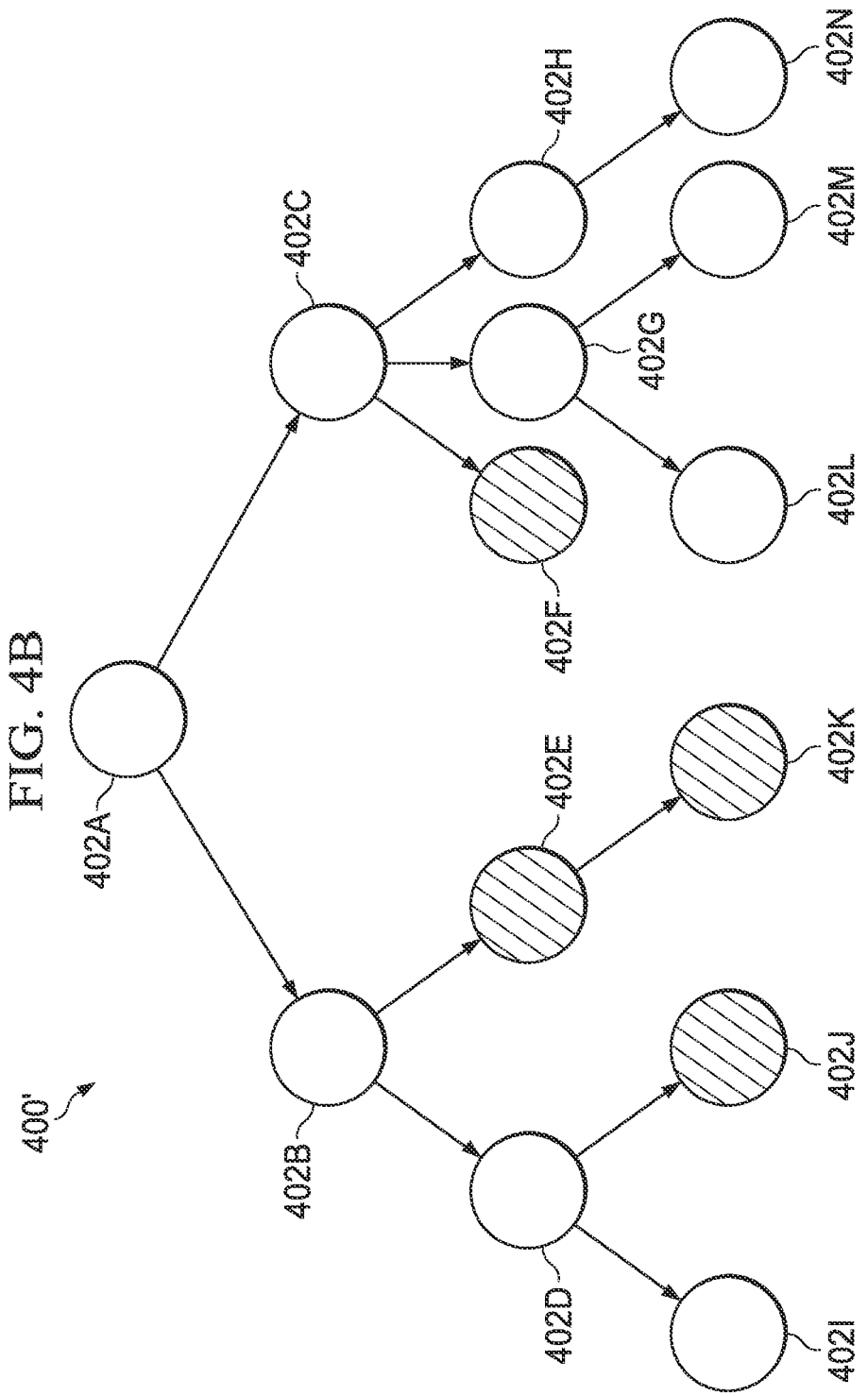

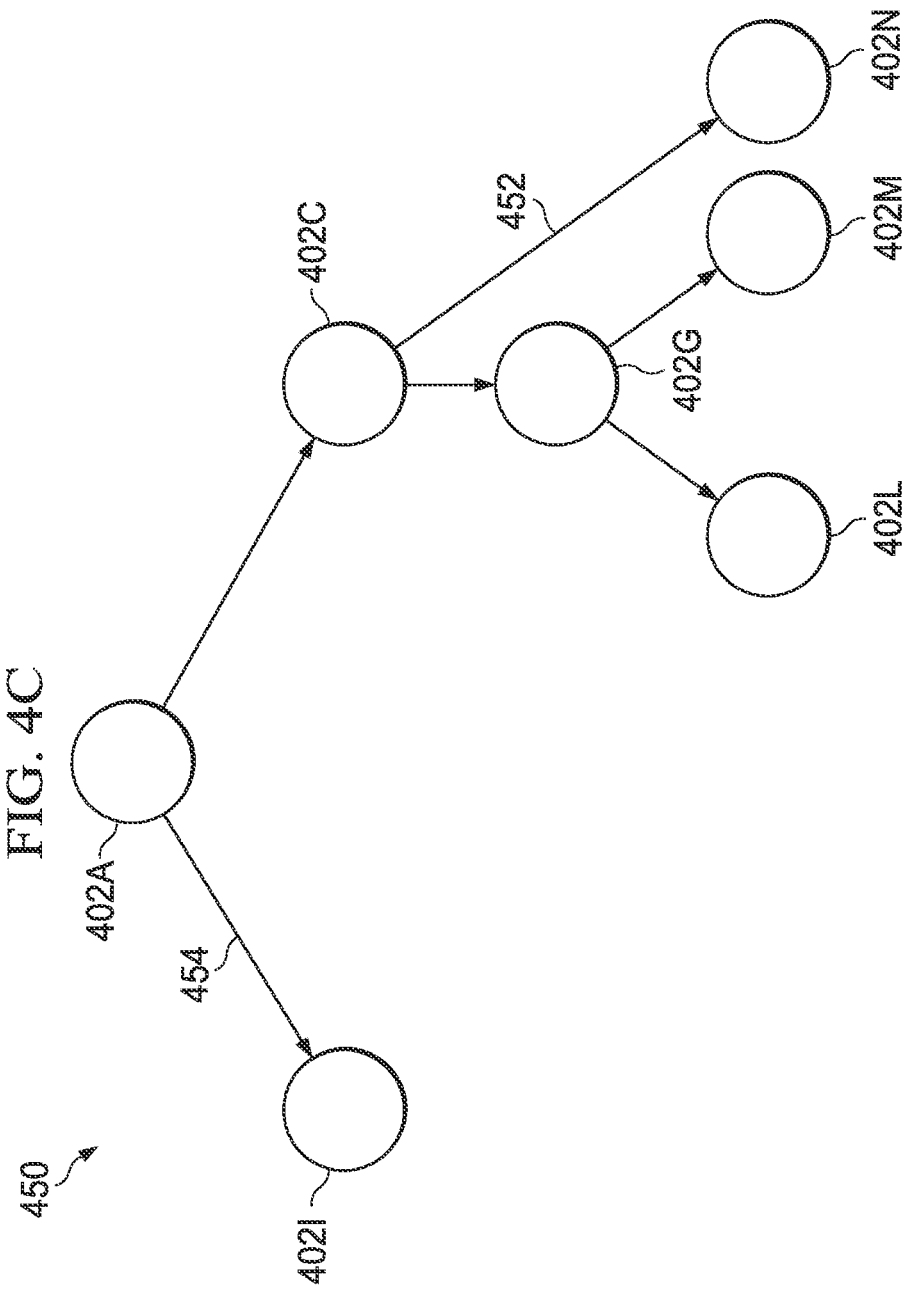

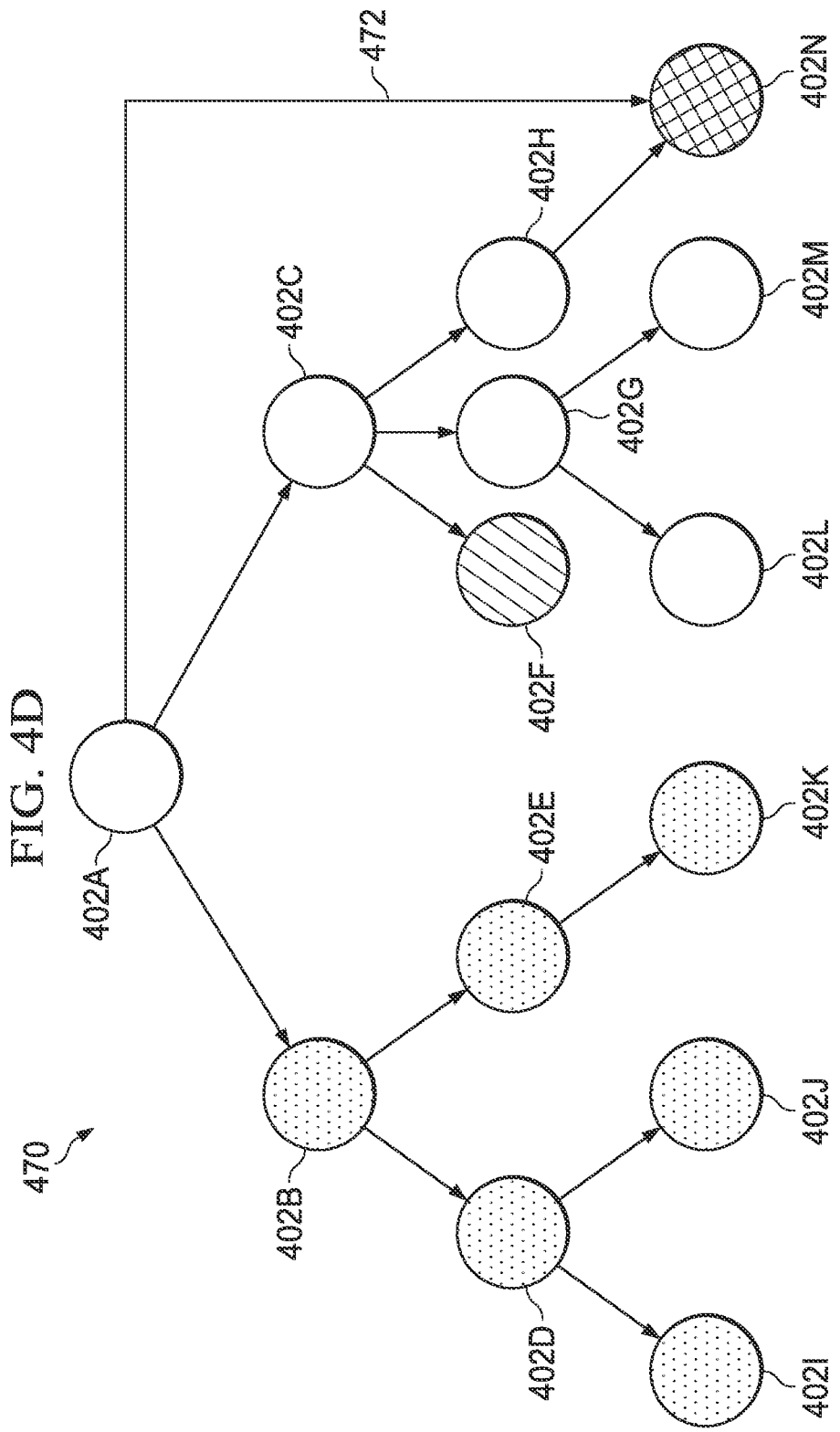

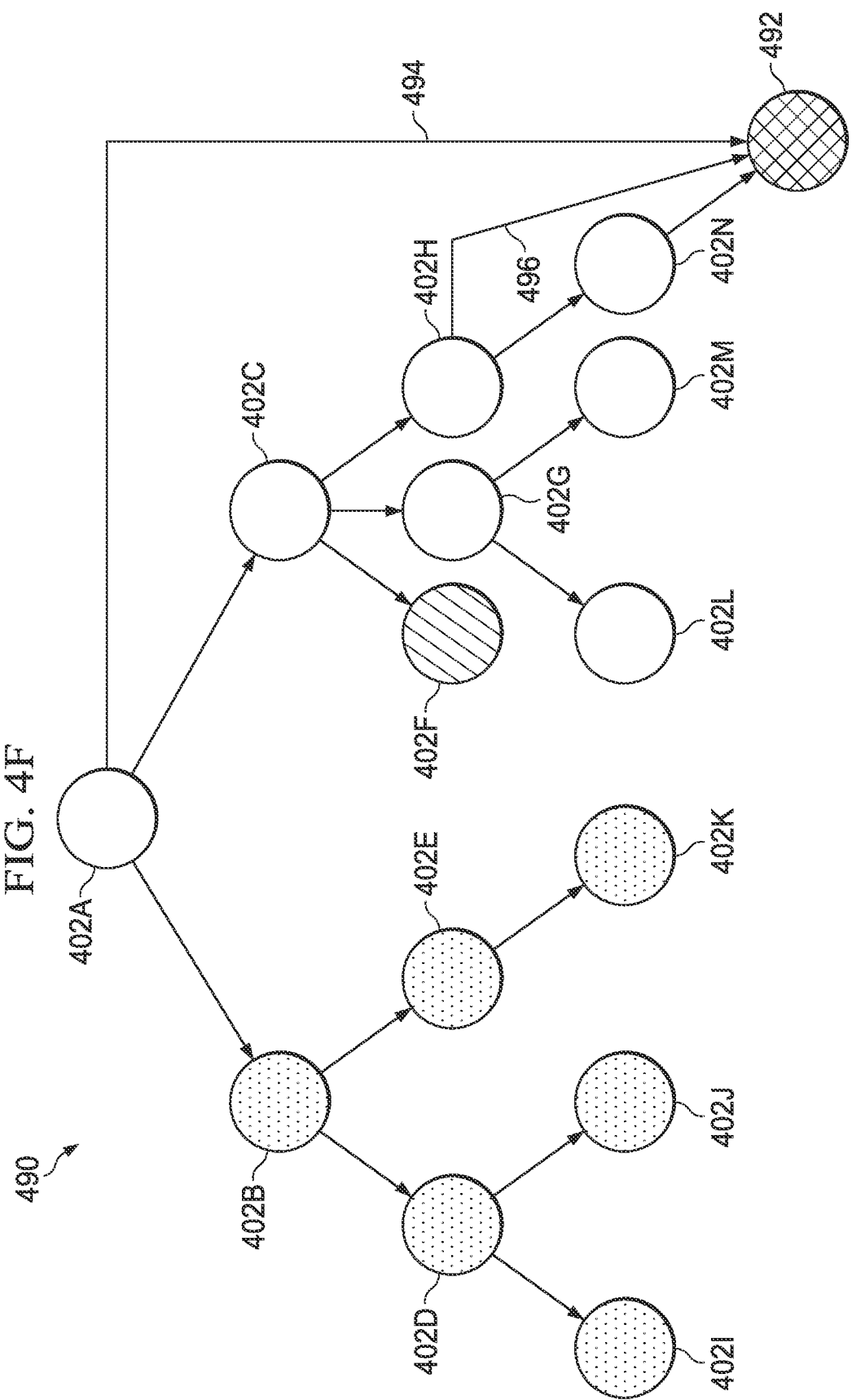

MANAGING WEB CONTENT ON A MOBILE COMMUNICATION DEVICE

TECHNICAL BACKGROUND

This disclosure relates to managing web content on a mobile communication device.

BACKGROUND

Business users of software in a business enterprise may access a virtual workspace through a portal to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. The workspace may allow or facilitate the resolution of business issues and/or problems by the user. In some instances, business users may access the virtual workspace (or other workspace, website, or other content) through the portal from a mobile device (e.g., smartphone, PDA, tablet, cell phone, or other mobile communication device). In some instances, for example when the portal exposes large amounts of web content, navigation of the web content can be problematic.

SUMMARY

This disclosure describes systems, methods, apparatus, and computer-readable media for managing display of web content on a mobile communication device. A navigational structure includes one or more containers (e.g., folders) that can include links to one or more additional containers and/or links to the web content. The one or more additional containers can also include links to the web content. The web content is filtered such that only relevant web content is displayed to a user of the mobile communications device. The content can be filtered based on a navigation history of the user.

In general embodiments including methods, apparatus, and systems, the present disclosure describes techniques for managing content on a mobile communication device that include generating a first navigation structure of web content including a plurality of linked web content portions; identifying a web content navigation history of a user including one or more web content portions accessed by the user in the plurality of linked web content portions; and generating a second navigation structure of the web content, the second navigation structure including links associated with only the one or more web content portions accessed by the user, the second navigation structure displayable on a mobile communication device.

A first aspect combinable with the general embodiments includes identifying, in the one or more web content portions accessed by the user, a first web content portion and a second web content portion not directly linked to the first web content portion.

A second aspect combinable with any of the previous aspects includes identifying, in the plurality of linked web content portions, a third content portion directly linked to the first web content portion and the second web content portion.

In a third aspect combinable with any of the previous aspects, the second navigation structure comprises links associated with the first and second web content portions but not the third web content portion.

In a fourth aspect combinable with any of the previous aspects, each of the first and second web content portions include one of a web page, an application interface, or a hosted document.

In a fifth aspect combinable with any of the previous aspects, the third web content portion includes one of a folder or a container.

A sixth aspect combinable with any of the previous aspects includes creating a direct link between the first and second web content portions.

A seventh aspect combinable with any of the previous aspects includes storing the web content navigation history of a user in computer-readable memory.

An eighth aspect combinable with any of the previous aspects includes determining an access frequency of each of the one or more web content portions accessed by the user.

A ninth aspect combinable with any of the previous aspects includes comparing the determined access frequency of each of the one or more web content portions accessed by the user to a threshold access frequency.

A tenth aspect combinable with any of the previous aspects includes determining, based on the comparison, a set of relevant web content portions, the set of relevant content portions including each of the one or more web content portions accessed by the user that has a determined access frequency greater than the threshold access frequency.

In an eleventh aspect combinable with any of the previous aspects, the second navigation structure comprises links associated with only the set of relevant web content portions.

A twelfth aspect combinable with any of the previous aspects includes creating direct links between each web content portion in the set of relevant content portions.

In a thirteenth aspect combinable with any of the previous aspects, each access frequency includes at least one of a time value and a visitation value.

In a fourteenth aspect combinable with any of the previous aspects, the time value includes a value associated with an amount of time the user accessed the particular web content portion.

In a fifteenth aspect combinable with any of the previous aspects, the visitation value includes a value associated with a number of visits to the particular web content portion by the user.

A sixteenth aspect combinable with any of the previous aspects includes determining a weighted value for each of the time value and the visitation value.

A seventeenth aspect combinable with any of the previous aspects includes determining the access frequency based on the weighted values.

An eighteenth aspect combinable with any of the previous aspects includes sending the second navigation structure to the mobile communication device.

In a nineteenth aspect combinable with any of the previous aspects, identifying a web content navigation history of a user including one or more web content portions accessed by the user in the plurality of linked web content portions includes identifying, substantially simultaneously with the user accessing the web content from the mobile communication device, a web content navigation history of a user including one or more web content portions accessed by the user in the plurality of linked web content portions.

In a twentieth aspect combinable with any of the previous aspects, the one or more web content portions accessed by user includes web content portions accessed by the user through the mobile communication device and web content portions accessed by the user through an enterprise computing device.

Various embodiments of a portal navigation module according to the present disclosure may have one or more of the following features. For example, a simplified navigation structure can presented when a user is browsing a web portal via a mobile communications device. For example, the simplification can be represented by shorter navigation paths to specific content objects that are commonly accessed by the user. Further advantages include filtering middle connections, or creating new connections to target objects. Thus, users will employ "fewer clicks" for reaching a desired page or application from the portal when navigating via a mobile communications device. Further advantages include simplicity in organization as no new set of roles will need to be defined. Thus, the optimization will use the original content structure and will perform the optimization based on the user's behaviors. Furthermore, the optimization can be a learning mechanism, and thus, the optimization will be live and relevant at all times.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIGS. 4A-4F illustrate example representations of navigation structures.

DETAILED DESCRIPTION

This specification describes systems, methods, apparatus, and computer-readable media for managing display of web content on a mobile communication device. A navigational structure includes one or more containers (e.g., folders) that can include links to one or more additional containers and/or links to the web content. The one or more additional containers can also include links to the web content. The web content is filtered such that only relevant web content is displayed to a user of the mobile communications device. The content can be filtered based on a navigation history of the user.

Figure 1:
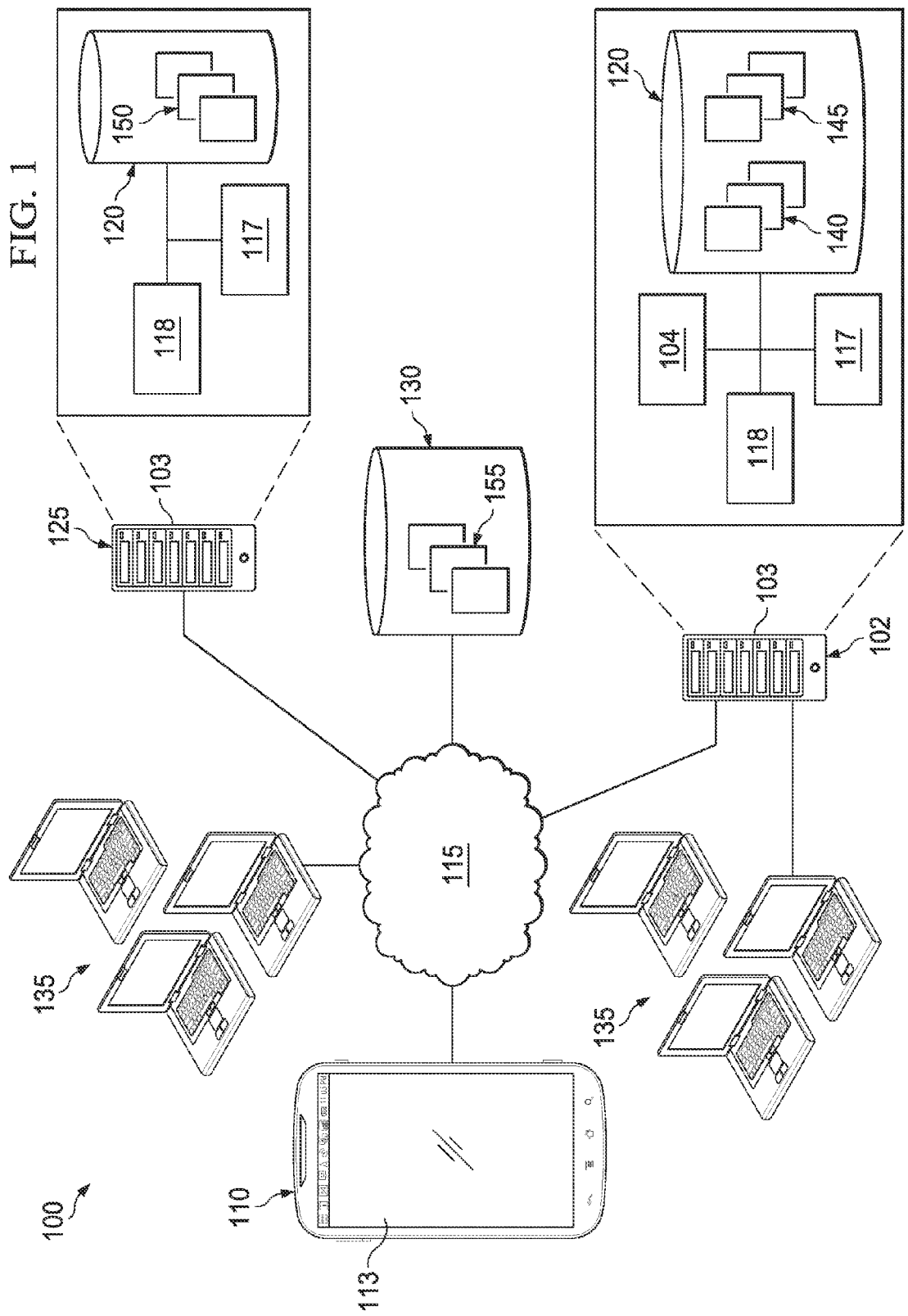
FIG. 1 illustrates an example distributed computing system operable to manage web content on a mobile communication device.

FIG. 1 illustrates an example distributed computing system 100 operable to manage web content on a mobile communication device 110. Specifically, the illustrated environment 100 includes or is communicably coupled with an enterprise computing system 102, a software provider computing system 125, a repository 130, one or more client computing devices 135 ("clients"), and the mobile communication device 110 ("mobile device"), at least some of which communicate across a network 115.

The enterprise computing system 102 and the software provider computing system 125 both include separate servers 103. In general, each server 103 is a server that stores one or more hosted applications, such as, for example, a web content filter module 104, where at least a portion of the hosted applications are executed via requests and responses sent to users or clients within and communicably coupled to the illustrated environment 100 of FIG. 1. In some instances, the server 103 may store a plurality of various hosted applications, while in other instances, the server 103 may be a dedicated server meant to store and execute only a single hosted application. In some instances, the server 103 may comprise a web server, where the hosted applications represent one or more web-based applications accessed and executed via network by the clients 135 or the mobile device 110 to perform the programmed tasks or operations of the hosted application.

At a high level, the server 103 comprises an electronic computing device operable to receive, transmit, process, store, or manage data and information associated with the environment 100. Specifically, the server 103 illustrated in FIG. 1 is responsible for receiving application requests from one or more client applications associated with the clients 135 or the mobile device 110 of environment 100 and responding to the received requests by processing said requests in the associated hosted application, and sending the appropriate response from the hosted application back to the requesting client application. In addition to requests from the clients 135 and the mobile device 110 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 103, environment 100 can be implemented using two or more servers 103, as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system. According to one embodiment, server 103 may also include or be communicably coupled with a mail server.

The server 103 of the enterprise computing system 102 includes a web content filter module 104. The web content filter module 104 filters the web content such that relevant web content is displayed to a user of the mobile device 110, as described further below. The content can be filtered based on a navigation history of the user. The web content filter module 104 can be implemented by and stored by any combination of the enterprise computing system 102, the software providing computer system 125, the repository 130, the clients 135, and the mobile device 100.

Each of the illustrated servers 103 further include an interface 117, a processor 118, and a memory 120. The interface 117 is used by the server 103 for communicating with other systems in a distributed environment (including within the environment 100) connected to the network 115 (e.g., the clients 135 or the mobile device 110, as well as other systems communicably coupled to the network 115). Generally, the interface 117 comprises logic encoded in software and/or hardware in a suitable combination and operable to communicate with the network 115. More specifically, the interface 117 may comprise software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. Specifically, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120 (or multiple memories 120). The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes repository 130. The repository 130 can be a cloud-based storage medium. For example, the repository 130 can be networked online storage where data is stored on virtualized pools of storage.

The illustrated environment of FIG. 1 also includes one or more clients 135 and the mobile device 110 (or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 comprises an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, touch screen terminal, workstation, network computer, kiosk, one or more processors within these or other devices, or any other suitable processing device.

The illustrated mobile device 110 is intended to encompass any mobile computing device such as a wireless data port, smart phone, personal data assistant (PDA), tablet computing device, one or more processors within these devices, or any other suitable processing device. For example, each client 135 and the mobile device 110 may comprise a computer that includes an input device, such as a keypad, touch screen, mouse (in the client 135 example), or other device that can accept user information, and an output device that conveys information associated with the operation of the computing systems 102, 125 or the client 135 or the mobile device 100 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include a plurality of user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

The environment 100 further includes user data 140, web content 150 and 155, and sub-portions of web content 145. In the illustrated embodiment, the user data 140 is stored by the memory 120 of the enterprise computing system 102. However, the user data 140 can be stored in any combination of the memory of the mobile device 110, the enterprise computing system 102, the software provider service computing system 125, the repository 130, and/or the clients 135. In some implementations, the user data 140 is stored by a third party that provides networked online storage.

The web content 150, 155 is the textual, visual or aural content that is encountered as part of the user experience on websites. The web content 150, 155 may include, among other things: text, images, sounds, videos, applications, sub-applications, and animations. The web content is stored by any combination of the software provider service computing system 125 and the repository 130.

The sub-portions of web content 145 are any kind of application, information, or service that can be visualized in a Web browser frame. The sub-portions of web content 145, in some embodiments, may be self-contained Web documents that are provided via a Uniform Resource Locator (URL) that are managed by the enterprise computing system 102. For example, the sub-portions of web content 145 can include alerts, reports, email, calendar, and other content. For example, if a user enters a word in a dictionary web content sub-portion 145, the definition appears inside the area of the sub-portion of web content 145. A link to usage examples, similar words, etc. can also be provided.

The sub-portions of web content 145 can include one or more of the characteristics of: stateless (not permanently connected to any component of the environment 100); embedded (non-dominant, parallel to other sub-portions of web content 145); provide previews on underlying processes and/or data; one-screen interactions; include only key functionality; provide direct access without navigation; push information and refresh periodically; integration with third-party software; and allow users to modify an appearance thereof. The sub-portions of web content 145 may provide data, for example, providing active information; monitor business processes; preview data and processes; display notifications for starting task-related processes; and offering access to often used data. The sub-portions of web content 145 may further provide direct access to simple applications; accelerated access to other applications; reduction of information and interaction to the necessary; and drag-and-relate that use outputs as inputs within the environment 100. The sub-portions of web content 145 offer customization such that specific sub-portions of web content 145, along with reduction of information and tailoring of information presented by the sub-portions of web content 145, can be implemented according to the user data 140.

As illustrated, the sub-portions of web content 145 are stored by the memory 120 of the enterprise computing system 102. However, the sub-portions of web content 145 can be stored in any combination of the memory the enterprise computing system 102, the software provider service computing system 125, and/or the repository 130.

Figure 2:
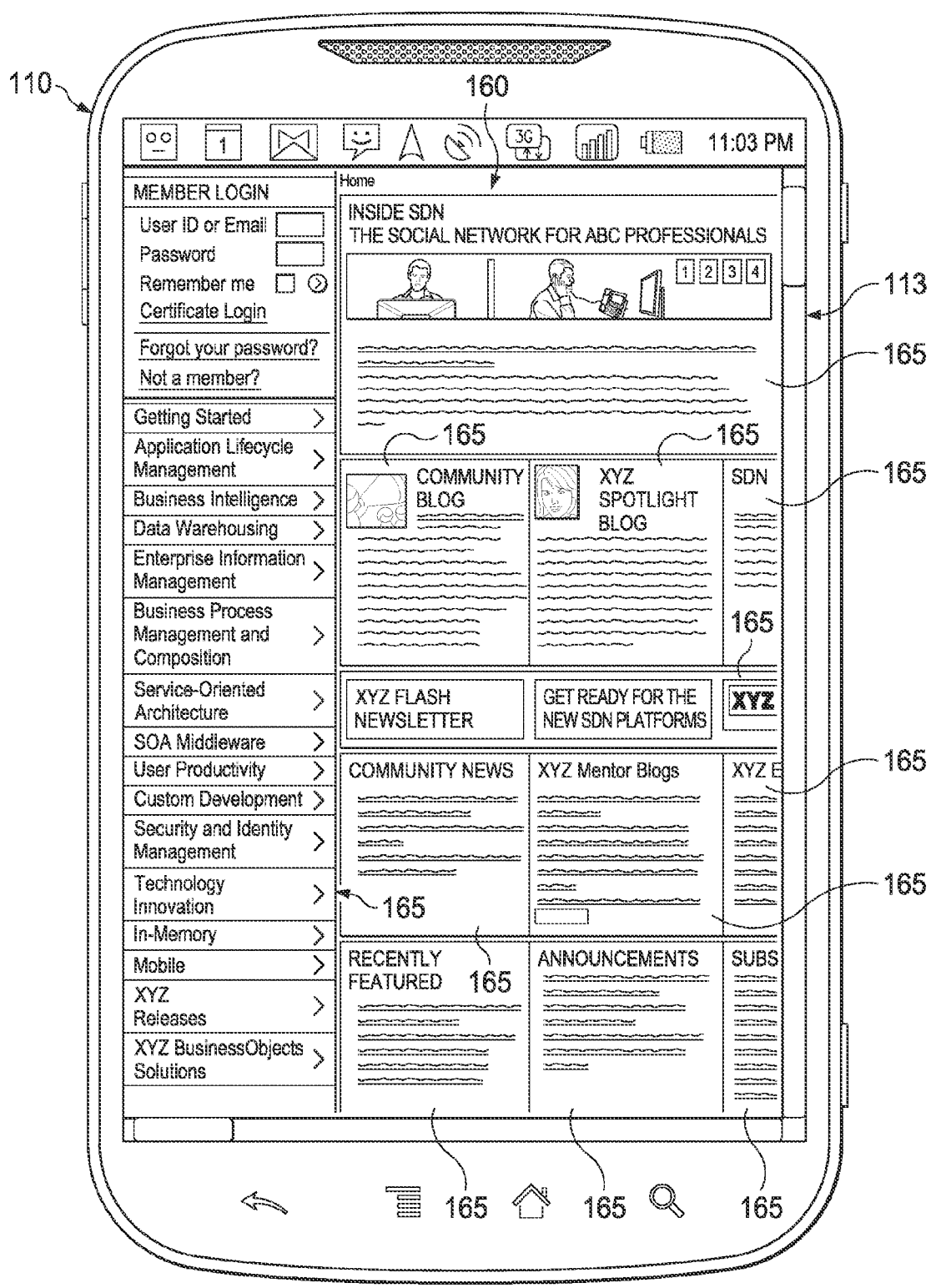
FIG. 2 illustrates an example mobile communication device displaying web content.

FIG. 2 illustrates an example mobile communication device 110 displaying web content. Specifically, the illustrated GUI 113 of the mobile device 110 can display a web portal 160 exposing web content 150 or 155 of FIG. 1. In some implementations, the GUI 113 can display a web browser including the web portal 160. The web portal 160 can include sub-portions of web content 165, analogous to the sub-portions of web content 145 of FIG. 1, that are used to build the web portal 160.

In some embodiments, the web portal 160 may be an enterprise portal, also known as an enterprise information portal (EIP) or corporate portal. The web portal 160 may be a framework for integrating information, people and processes across organizational boundaries. It provides a secure unified access point, often in the form of a web-based user interface, and is designed to aggregate and personalize information through application-specific portlets. For example, the web portal 160 may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether.

Figure 3:
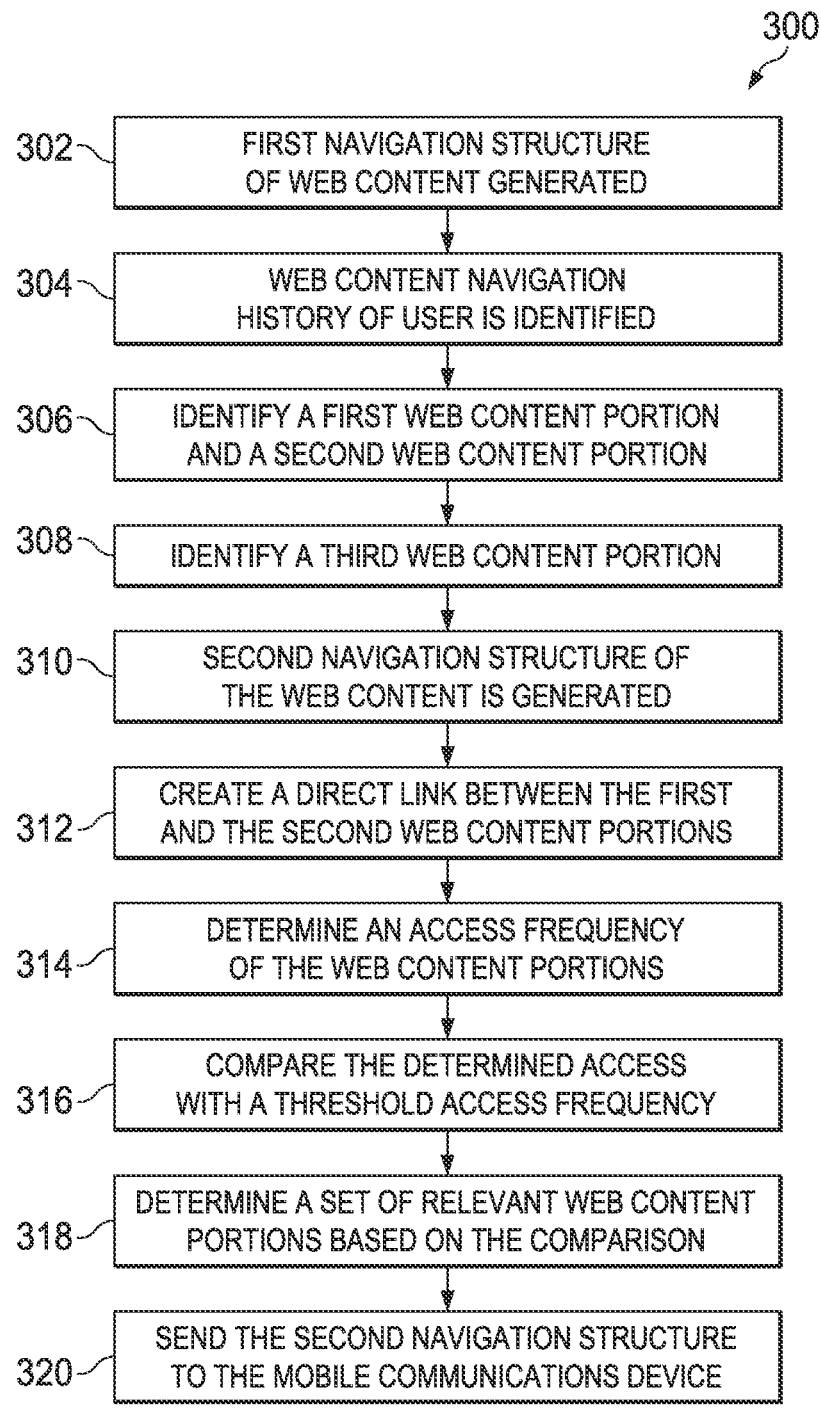
FIG. 3 illustrates a flowchart describing an example method for managing web content on a mobile communication device.

FIG. 3 illustrates an example method 300 for managing content on a mobile communication device. The example method 300 can be executed, for example, by the web content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

Figure 4A:
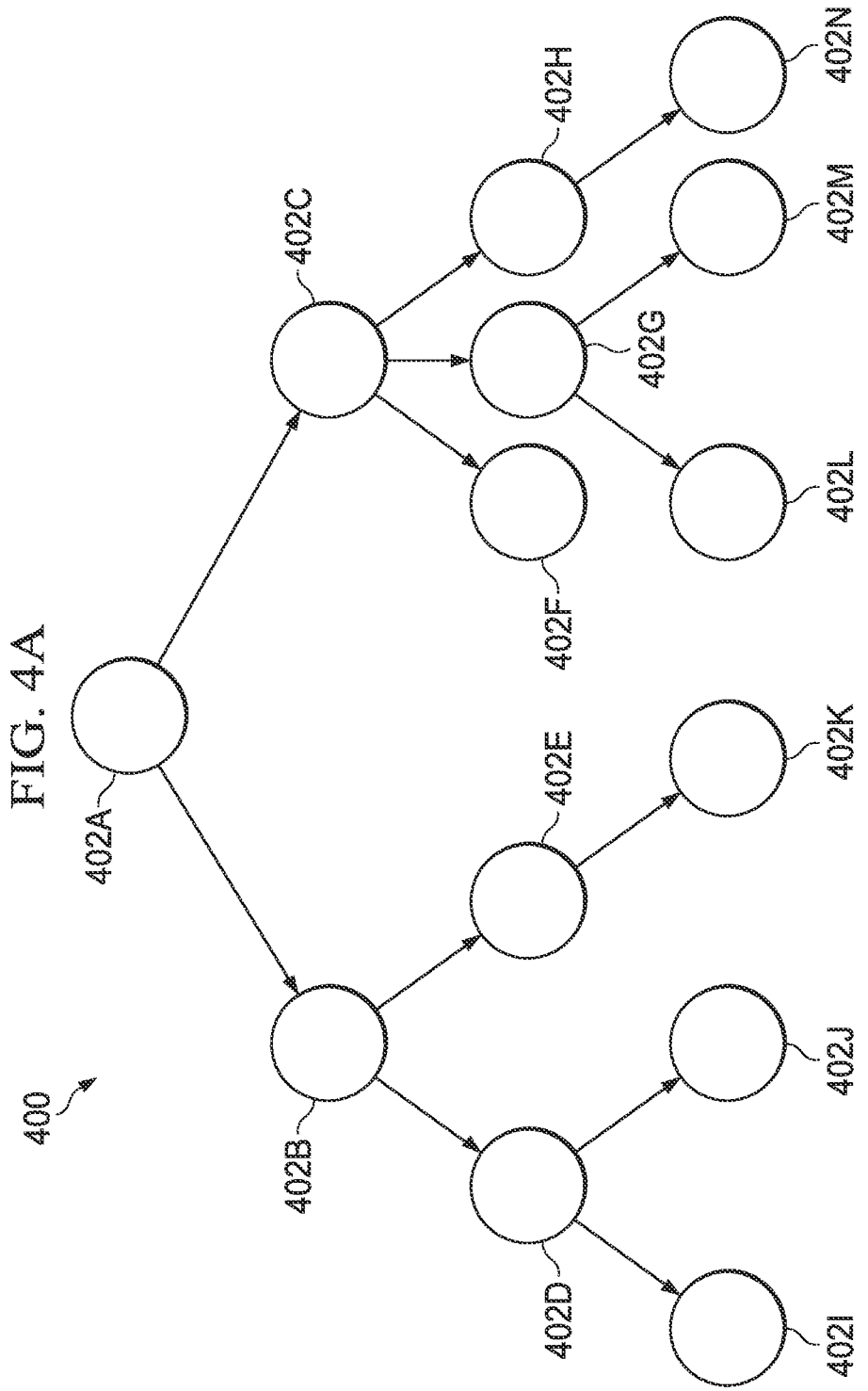

In step 302, a first navigation structure of web content is generated. The first navigation structure can comprise a plurality of linked web content portions. In some embodiments, the first navigation structure includes a tree-based graph structure 400, as shown in FIG. 4. The tree-based graph structure 400 includes nodes 402A-402N. Nodes 402A-402N include web content portions, and specifically, nodes 402A-402E, 402G, and 402H may be containers (e.g., folders or "navigation nodes 402") and nodes 402F and 402I-402N may be, for example, a web page, an application interface, and/or a hosted document (e.g., "leaf nodes 402"). The navigation nodes 402 provide access to other navigation nodes 402 or to leaf nodes 402. For example, the node 402A provides access to the nodes 402B and 402C. The node 402B provides access to the nodes 402D and 402E. The node 402D provides access to the nodes 402I and 402J. The node 402E provides access to the node 402K. Furthermore, for example, the node 402C provides access to nodes 402F, 402G, and 402H. Node 402G provides access to nodes 402L and 402M. Node 402H provides access to node 402N. In some embodiments, the navigations nodes 402 can include the web portal 165 and the leaf nodes 402 can include the web content 160.

Alternatively, in some embodiments, the web content portions are accessed by the user through a mobile communications device and/or through an enterprise computing device. For example, the web content 160 may be accessed by the user of the mobile device 110 and/or through the enterprise computing system 102. Alternatively, in some embodiments, the web content portions that are accessed thru the mobile communications device differ from the web content portions that are accessed through the enterprise computing device. Alternatively, in some embodiments, a portion of the web content portions that are accessed through the enterprise computing device are also accessed through the mobile communications device.

In step 304, a web content navigation history of a user is identified. The web content navigation history can comprise one or more web content portions accessed by the user in the plurality of linked web content portions. For example, the user data 140 can include the web content navigation history of the user. In some embodiments, the web content navigation history includes a tree based graph structure 400', as shown in FIG. 4B, including the nodes 402. The nodes 402 can include accessed nodes and/or un-accessed nodes. For example, nodes 402A-402D, 402G-402I, and 402L-402N have been accessed by the user ("accessed nodes 402"); and nodes 402E, 402F, 402J, and 402K have not been accessed by the user ("un-accessed nodes 402"). However, the accessed nodes 402 and the un-accessed nodes 402 can include any combination of nodes 402A-402N. In some embodiments, the accessed nodes 402 are nodes that have been accessed by the user within a predetermined time period (e.g., 1 day, 1 month, 1 year) and the un-accessed nodes 402 are nodes that have not been accessed by the user within the predetermined time period. Alternatively, in some embodiments, the accessed nodes 402 are nodes that have been accessed by the user a number of times within the predetermined time period and the un-accessed nodes 402 are nodes that have not been accessed by the user a number of times within the predetermined time period. Alternatively, in some embodiments, the accessed nodes 402 are nodes that have been accessed by the user for an amount of time above a threshold within the predetermined time period and the un-accessed nodes 402 are nodes that have not been accessed by the user an amount of time above the threshold within the predetermined time period.

In step 306, a first web content portion and a second web content portion can be identified, with the second web content portion not directly linked to the first web content portion. For example, the first web content portion can include the accessed node 402C and the second web content portion can include the accessed node 402N. Further, the accessed node 402C may not be directly linked to the accessed node 402N. In step 308, a third web content portion can be identified that is directly linked to the first web content portion and the second web content portion. For example, the third web content portion can include the accessed node 402H. The accessed node 402H is directly linked to the accessed node 402C and the accessed node 402N.

Alternatively, in some embodiments, the web content navigation history of the user is identified substantially simultaneously with the user accessing the web content from the mobile communications device. For example, accessed nodes 402 and un-accessed nodes 402 of the tree based graph structure 400' can be identified simultaneously with the user accessing the nodes (e.g., the web content 160) of the tree based graph structure 400'.

Alternatively, in some embodiments, the web content navigation history of the user is stored in a computer-readable memory. For example, the web content navigation history can be stored by the memory of the mobile device 110, the computing systems 102, 125, the repository 130, and/or the clients 135.

In step 310, a second navigation structure of the web content is generated. The second navigation structure can comprise links associated with only the one or more web content portions accessed by the user, with the second navigation structure can be displayable on a mobile communication device. For example, the second navigation structure includes a tree based graph structure 450, as shown in FIG. 4C, including a portion of the accessed nodes 402 of the tree based graph structure 400'. Specifically, the un-accessed nodes 402 are filtered (e.g., removed) such that the tree based graph structure 450 only includes accessed nodes 402. Furthermore, a portion of the accessed nodes 402 can be filtered to remove accessed nodes 402 that do not provide substance (e.g., additional information) to the user. Rather, this portion of the accessed nodes 402 provides navigational access to other accessed nodes 402 (e.g., the leaf nodes 402). For example, the accessed nodes 402B and 402D ultimately provide access to the accessed node 402I without providing additional information to the user. Thus, the accessed nodes 402B and 402D are filtered from the tree based graph structure 450.

Alternatively, in some embodiments, based on removing the portion of accessed nodes 402 and the un-accessed nodes 402, the tree based graph structure 450 includes direct links associated with the aforementioned first and the second web content portions, but does not include links associated with the third web content portion. For example, the tree based graph structure 450 includes direct links associated with the accessed node 402C (the first web content portion) and the accessed node 402N (the second web content portion). Furthermore, the tree based graph structure 450 does not include links associated with the accessed node 402H (the third web content portion). For example, the tree based graph structure 450 does not include a direct link between the accessed node 402C and the accessed node 402H or between the accessed node 402H and the accessed node 402N as a result of the accessed node 402H being filtered (e.g., removed) from the tree based graph structure 450.

In step 312, a direct link can be created between the first and the second web content portions. For example, a direct link can be created between the accessed node 402C and the accessed node 402N. The tree based graph structure 450 provides direct links between the accessed nodes 402 based on the navigation paths of the tree based graph structure 400'. For example, as mentioned above, the accessed node 402C provides access to the accessed node 402H; and the accessed node 402H provides access to the accessed node 402N. Thus, the accessed node 404C ultimately provides, at least, access to the accessed node 402N. To that end, the accessed node 402H is removed from the tree based graph structure 450 as it does not provide additional information to the user. Thus, a direct link 452 is provided between the accessed node 402C and the accessed node 402N. Similarly, the accessed node 402A also, at least, ultimately provides access to the accessed node 402I, and thus, a direct link 454 is provided between the accessed node 402A and the accessed node 402I. Alternatively, in some embodiments, direct links (not shown) can be provided between the accessed node 402C and the accessed nodes 402L and 402M.

In some examples, when the user accesses the web portal 160, only accessed web content 165 relating to accessed nodes 402I, 402G, and 402N are shown. Alternatively, in some embodiments, when the user accesses the web portal 160, only accessed web content 165 relating to accessed nodes 402I, 402L, 402M, and 402N are shown.

In step 314, an access frequency of each of the web content portents accessed by the user can be determined. For example, an access frequency of each of the accessed nodes 402 can be determined. In step 316, the determined access frequency of each of the web content portions can be compared to a threshold access frequency. For example, the access frequency of each of the accessed nodes 402 can be compared to the threshold access frequency. In step 318, based upon the comparison, a set of relevant web content portions can be determined that each comprise one of the web content portions accessed by the user that have an access frequency above the threshold access frequency. For example, the web content navigation history includes a tree based graph structure 470, as shown in FIG. 4D, including the nodes 402, with the nodes 402 included unaccessed nodes, accessed nodes having an access frequency above a threshold, and accessed nodes having an access frequency below a threshold. For example, node 402F has not been accessed by the user; nodes 402B, 402D, 402E, and 402I-402K have been accessed by the user with an access frequency below the threshold access frequency; and nodes 402A, 402C, 402G, 402H, and 402L-402N (i.e., the relevant web content portions) have been accessed by the user with an access frequency above the threshold access frequency. Further, in some embodiments, node 402N can have an access frequency above an additional threshold access frequency that is greater than the threshold access frequency. Thus, based on the access frequency of the node 402N being above the additional threshold access frequency, a direct link 472 is provided between the accessed node 402A and the accessed node 402N.

Figure 4E:
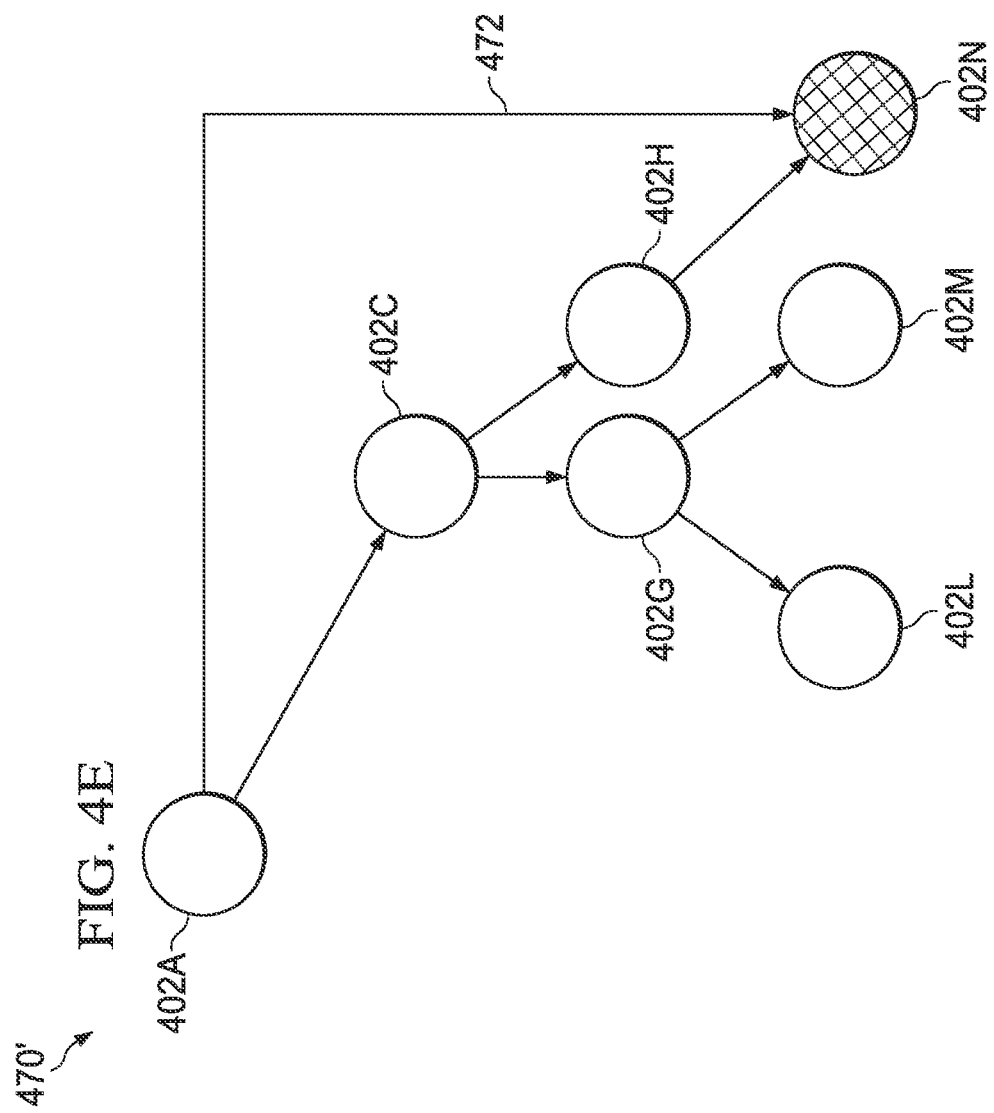

Alternatively, in some embodiments, the second navigation structure includes links associated with only the set of relevant web content portions. For example, the second navigation structure includes a tree based graph structure 470', as shown in FIG. 4E, including the nodes 402 that have been accessed by the user with an access frequency above the threshold access frequency, e.g., the nodes 402A, 402C, 402G, 402H, and 402L-402N (i.e., the relevant web content portions).

Alternatively, in some embodiments, the access frequency can comprise at least one of a time value and a visitation value. For example, the time value can comprise a value associated with an amount of time the user has accessed the accessed nodes 402, and specifically, the accessed nodes 402A, 402C, 402G, 402H, and 402L-402N. The visitation value can comprise a value associated with a number of accesses (e.g., visits) by the user to the access nodes 402, and specifically, the accessed nodes 402A, 402C, 402G, 402H, and 402L-402N.

Alternatively, in some embodiments, a weighted value can be determined for each of the time value and the visitation value, with the access frequency being determined based on the weighted values. For example, the access frequency of the accessed nodes 402 can be based on the weighted values of the time value and the visitation value.

In step 320, the second navigation structure is sent to the mobile communications device. For example, the tree based graph structure 450 is transmitted to the mobile device 110 and displayable upon the mobile device 110. Alternatively, in some embodiments, only the second navigation structure is displayable upon the mobile device 110.

Alternatively, in some embodiments, the first navigation structure can comprise a plurality of linked web content portions, with at least two web content portions having a nonparental relationship. For example, the first navigation structure includes a tree-based graph structure 490, as shown in FIG. 4F.

Specifically, the tree-based graph structure 490 includes the nodes 402, with the nodes 402 included unaccessed nodes, accessed nodes having an access frequency above a threshold, and accessed nodes having an access frequency below a threshold. For example, the node 402F has not been accessed by the user; the nodes 402B, 402D, 402E, and 402I-402K have been accessed by the user with an access frequency below the threshold access frequency; and the nodes 402A, 402C, 402G, 402H, and 402L-402N (i.e., the relevant web content portions) have been accessed by the user with an access frequency above the threshold access frequency. Further, the tree-based graph structure 490 includes a related node 492. The related node 492 is related to node 402N in that the node 402N includes a link to the related node 492, with the related node 492 being accessed by the user from the node 402N. The related node 492 can have an access frequency above an additional threshold access frequency. Thus, based on the access frequency of the node 492 being above the additional threshold access frequency, a direct link 494 is provided between the accessed node 402A and the related node 492. In some embodiments, based on the access frequency of the node 492 being above the additional threshold access frequency, a direct link 496 is provided, in addition to or in lieu of the direct link 494, between the accessed node 402H and the related node 492.

A number of implementations have been described. Nevertheless, it will be understood that various modifications may be made. For example, other methods described herein besides or in addition to that illustrated in FIG. 3 may be performed. Further, the illustrated steps of method 300 may be performed in different orders, either concurrently or serially. Further, steps may be performed in addition to those illustrated in method 300, and some steps illustrated in method 300 may be omitted without deviating from the present disclosure. Accordingly, other implementations are within the scope of the following claims.

What is claimed is:

1. A method performed with a computing system for managing content on a mobile communication device, the method comprising:
    generating a first navigation structure of web content comprising a plurality of linked web content portions presented in an enterprise portal;
    identifying a web content navigation history of a user comprising one or more web content portions accessed by the user in the plurality of linked web content portions;
    identifying, in the one or more web content portions accessed by the user, a first web content portion, a second web content portion directly linked to the first web content portion, and a third web content portion directly linked to the second web content portion and indirectly linked to the first web content portion through the second web content portion;
    generating a second navigation structure of the web content by removing the second web content portion from the second navigation structure, the second navigation structure comprising a direct link between the first web content portion and the third web content portion; and
    preparing the second navigation structure for display on a mobile communication device.

2. The method of claim 1, wherein the second navigation structure comprises links associated with the first and third web content portions but not the second web content portion.

3. The method of claim 1, wherein each of the first and third web content portions comprise one of a web page, an application interface, or a hosted document, and
    the second web content portion comprises one of a folder or a container.

4. The method of claim 1, further comprising:
    storing the web content navigation history of a user in computer-readable memory.

5. The method of claim 1, further comprising:
    determining an access frequency of each of the one or more web content portions accessed by the user;
    comparing the determined access frequency of each of the one or more web content portions accessed by the user to a threshold access frequency; and
    determining, based on the comparison, a set of relevant web content portions, the set of relevant content portions comprising each of the one or more web content portions accessed by the user that has a determined access frequency greater than the threshold access frequency.

6. The method of claim 5, wherein the second navigation structure comprises links associated with only the set of relevant web content portions.

7. The method of claim 5, further comprising:
    creating direct links between each web content portion in the set of relevant content portions.

8. The method of claim 5, wherein each access frequency comprises at least one of a time value and a visitation value, the time value comprising a value associated with an amount of time the user accessed the particular web content portion, and the visitation value comprises a value associated with a number of visits to the particular web content portion by the user.

9. The method of claim 8, further comprising:
determining a weighted value for each of the time value and the visitation value; and
determining the access frequency based on the weighted values.

10. The method of claim 1, further comprising:
sending the second navigation structure to the mobile communication device.

11. The method of claim 1, wherein identifying a web content navigation history of a user comprising one or more web content portions accessed by the user in the plurality of linked web content portions comprises identifying, substantially simultaneously with the user accessing the web content from the mobile communication device, a web content navigation history of a user comprising one or more web content portions accessed by the user in the plurality of linked web content portions.

12. The method of claim 1, wherein the one or more web content portions accessed by user comprises web content portions accessed by the user through the mobile communication device and web content portions accessed by the user through an enterprise computing device.

13. An apparatus comprising instructions embodied on a tangible, non-transitory computer-readable media, the instructions operable when executed to cause a computing system to perform operations comprising:
generating a first navigation structure of web content comprising a plurality of linked web content portions presented in an enterprise portal;
identifying a web content navigation history of a user comprising one or more web content portions accessed by the user in the plurality of linked web content portions;
identifying, in the one or more web content portions accessed by the user, a first web content portion, a second web content portion directly linked to the first web content portion, and a third web content portion directly linked to the second web content portion and indirectly linked to the first web content portion through the second web content portion;
generating a second navigation structure of the web content by removing the second web content portion from the second navigation structure, the second navigation structure comprising a direct link between the first web content portion and the third web content portion; and
preparing the second navigation structure for display on a mobile communication device.

14. The apparatus of claim 13
wherein the second navigation structure comprises links associated with the first and third web content portions but not the second web content portion.

15. The apparatus of claim 13, wherein each of the first and third web content portions comprise one of a web page, an application interface, or a hosted document, and
the second web content portion comprises one of a folder or a container.

16. The apparatus of claim 13, wherein the operations further comprise:
determining an access frequency of each of the one or more web content portions accessed by the user;
comparing the determined access frequency of each of the one or more web content portions accessed by the user to a threshold access frequency; and
determining, based on the comparison, a set of relevant web content portions, the set of relevant content portions comprising each of the one or more web content portions accessed by the user that has a determined access frequency greater than the threshold access frequency.

17. The apparatus of claim 16, wherein the second navigation structure comprises links associated with only the set of relevant web content portions.

18. The apparatus of claim 16, wherein the operations further comprise:
creating direct links between each web content portion in the set of relevant content portions.

19. The apparatus of claim 16, wherein each access frequency comprises at least one of a time value and a visitation value, the time value comprising a value associated with an amount of time the user accessed the particular web content portion, and the visitation value comprises a value associated with a number of visits to the particular web content portion by the user.

20. The apparatus of claim 19, wherein the operations further comprise:
determining a weighted value for each of the time value and the visitation value; and
determining the access frequency based on the weighted values.

21. The apparatus of claim 13, wherein identifying a web content navigation history of a user comprising one or more web content portions accessed by the user in the plurality of linked web content portions comprises identifying, substantially simultaneously with the user accessing the web content from the mobile communication device, a web content navigation history of a user comprising one or more web content portions accessed by the user in the plurality of linked web content portions.

22. The apparatus of claim 13, wherein the one or more web content portions accessed by user comprises web content portions accessed by the user through the mobile communication device and web content portions accessed by the user through an enterprise computing device.

23. A computing system, comprising one or more memory modules, one or more processors, and instructions stored on one or more of the memory modules and operable when executed with the one or more processors to perform operations comprising:
generating a first navigation structure of web content comprising a plurality of linked web content portions presented in an enterprise portal;
identifying a web content navigation history of a user comprising one or more web content portions accessed by the user in the plurality of linked web content portions;
identifying, in the one or more web content portions accessed by the user, a first web content portion, a second web content portion directly linked to the first web content portion, and a third web content portion directly linked to the second web content portion and indirectly linked to the first web content portion through the second web content portion;
generating a second navigation structure of the web content by removing the second web content portion from the second navigation structure, the second navigation structure comprising a direct link between the first web content portion and the third web content portion; and
preparing the second navigation structure for display on a mobile communication device.

24. The system of claim 23
wherein the second navigation structure comprises links associated with the first and third web content portions but not the second web content portion.

25. The system of claim 23, wherein each of the first and third web content portions comprise one of a web page, an application interface, or a hosted document, and
the second web content portion comprises one of a folder or a container.

26. The system of claim 23, wherein the operations further comprise:
determining an access frequency of each of the one or more web content portions accessed by the user;
comparing the determined access frequency of each of the one or more web content portions accessed by the user to a threshold access frequency; and
determining, based on the comparison, a set of relevant web content portions, the set of relevant content portions comprising each of the one or more web content portions accessed by the user that has a determined access frequency greater than the threshold access frequency.

27. The system of claim 26, wherein the second navigation structure comprises links associated with only the set of relevant web content portions.

28. The system of claim 26, wherein the operations further comprise:
creating direct links between each web content portion in the set of relevant content portions.

29. The system of claim 26, wherein each access frequency comprises at least one of a time value and a visitation value, the time value comprising a value associated with an amount of time the user accessed the particular web content portion, and the visitation value comprises a value associated with a number of visits to the particular web content portion by the user.

30. The system of claim 29, wherein the operations further comprise:
determining a weighted value for each of the time value and the visitation value; and
determining the access frequency based on the weighted values.

31. The system of claim 23, wherein identifying a web content navigation history of a user comprising one or more web content portions accessed by the user in the plurality of linked web content portions comprises identifying, substantially simultaneously with the user accessing the web content from the mobile communication device, a web content navigation history of a user comprising one or more web content portions accessed by the user in the plurality of linked web content portions.

32. The system of claim 23, wherein the one or more web content portions accessed by user comprises web content portions accessed by the user through the mobile communication device and web content portions accessed by the user through an enterprise computing device.

* * * * *